R. R. BANTA.
FLUSH VALVE.
APPLICATION FILED JULY 29, 1918.
1,416,317.
Patented May 16, 1922.
3 SHEETS—SHEET 1.
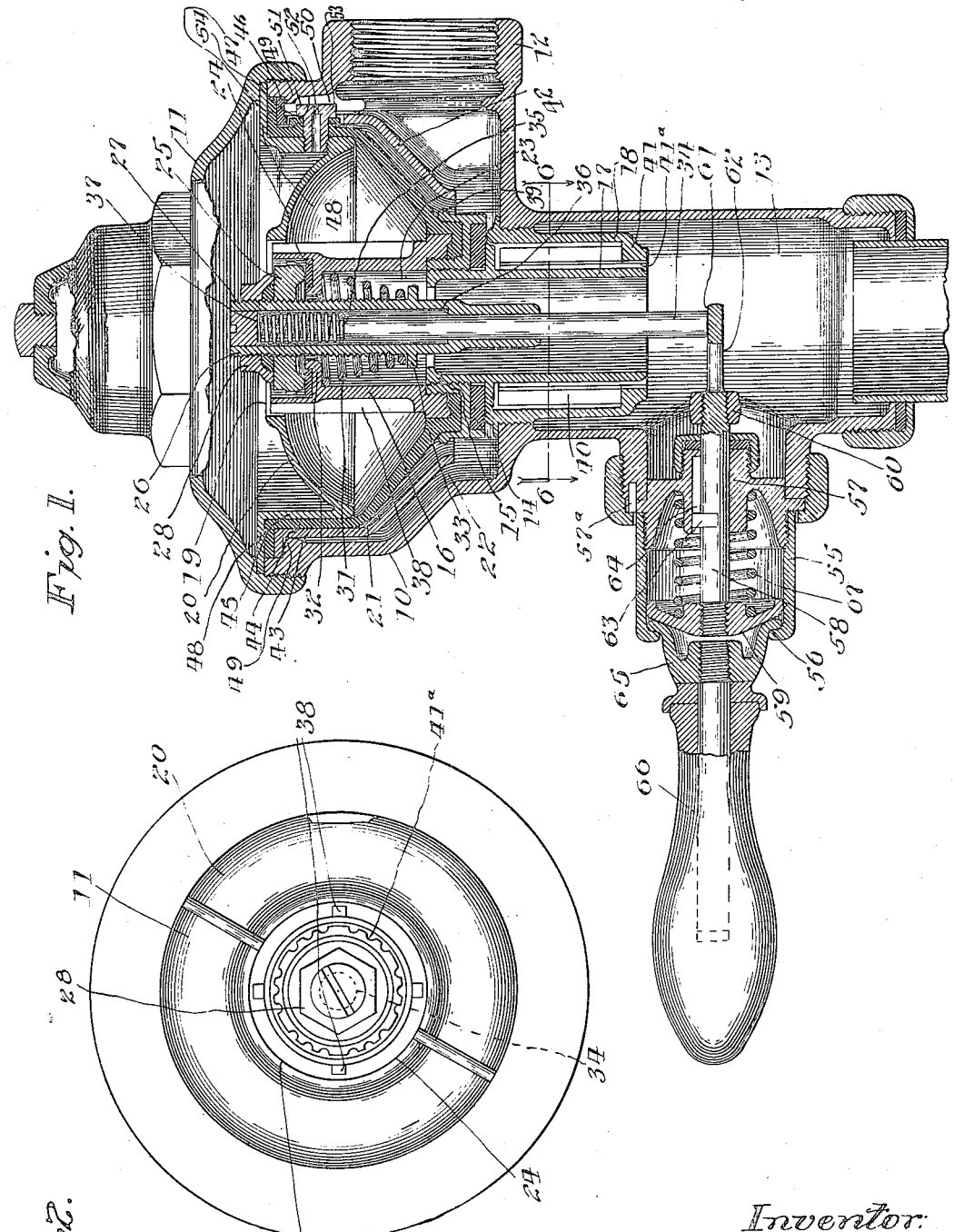

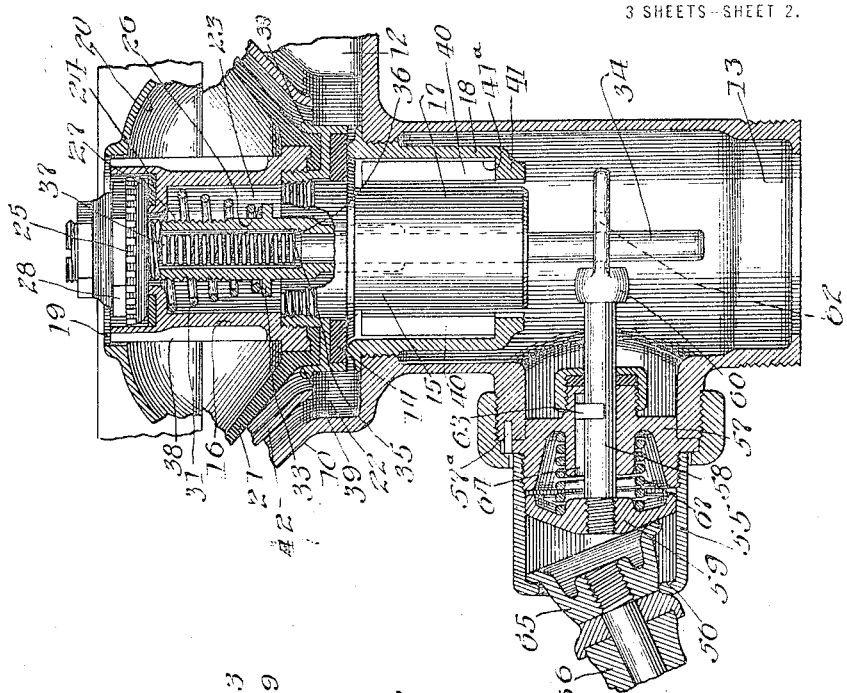
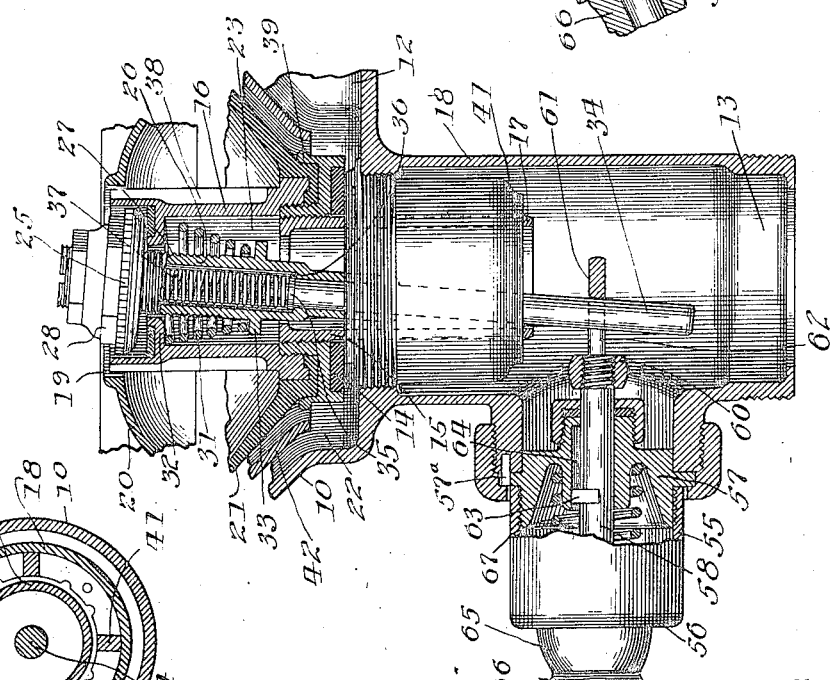
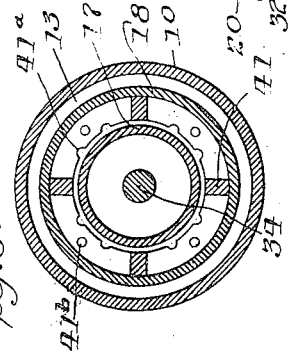

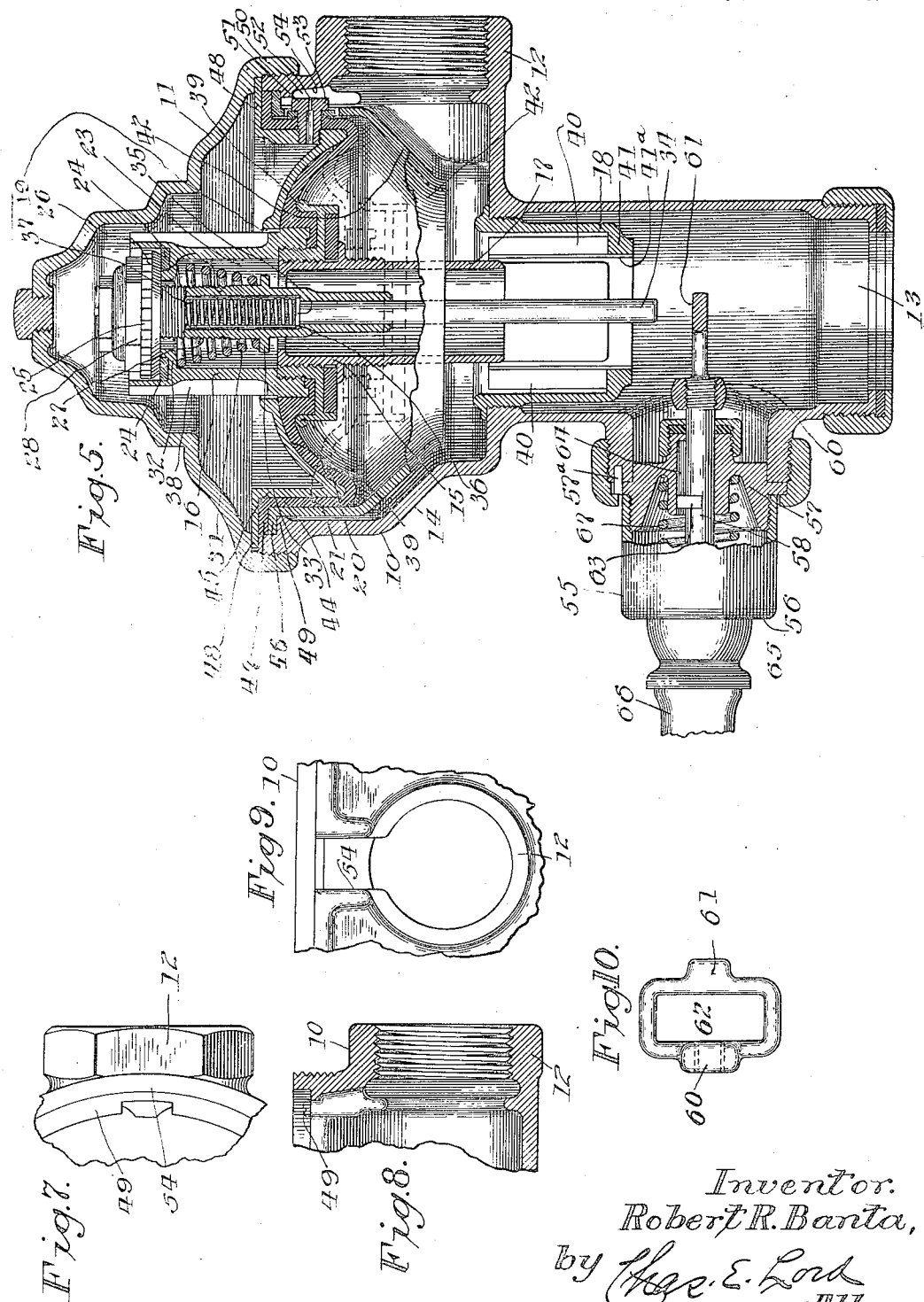

UNITED STATES PATENT OFFICE.

ROBERT R. BANTA, OF CHICAGO, ILLINOIS.

FLUSH VALVE.

1,416,317.   Specification of Letters Patent.   Patented May 16, 1922.

Application filed July 29, 1918. Serial No. 247,325.

*To all whom it may concern:*

Be it known that I, ROBERT R. BANTA, a citizen of the United States, residing at Chicago, in the county of Cook and State of Illinois, have invented certain new and useful Improvements in Flush Valves, of which the following is a full, clear, and exact specification.

My invention relates to improvements in valves, and particularly flush valves, such as are used in connection with water closets and the like.

It is customary in flush valves to provide a main valve, which is open and closed by variations in the water or other fluid pressure on opposite sides of a diaphragm or piston which divides the enclosing casing into an operating and a controlling chamber. Both chambers are connected to a source of water supply, and the main valve is opened when the water pressure in the controlling chamber is reduced by the opening of a controlling valve, and is closed when the water pressures in the controlling and operating chambers become equalized through the agency of a restricted by-pass or port. Such valves do not possess features that insure a measured duration of flush, and hence they may or may not give a full flush. If they are tripped with a snap, the flush will be short, and if they are tripped slowly the flush will be normal. In the case of snappy tripping, the controlling valve closes before the main valve has been opened the predetermined amount, and hence an improper flushing action results.

The main objects of my invention are to overcome the objections to existing forms of flush valves, such as improper flushing, water hammer, port clogging, improper refill to the closet bowl, etc., and to provide a valve mechanism which will be simple, effective, and foolproof in its construction and assembly, and will be positive and reliable in its operation, and capable of easy adjustment to regulate the quantity or duration of the water or other fluid flushed regardless of the pressure of the water supply.

In carrying out the objects of my invention, I have developed an improved form of flush valve in which the control of the quantity or duration of the water or other fluid flushed is effected by adjusting and controlling positively the amount of water or other fluid which is permitted to escape from the controlling chamber, and not by an adjustment of the flow of water or other fluid into the controlling chamber from the source of supply. This is preferably accomplished by providing means for positively opening the controlling valve, regardless of the rapidity with which the actuating mechanism is operated, and for positively maintaining said controlling valve open for a predetermined length of time. Adjusting means is also provided, for varying the predetermined length of time during which the controlling valve is held open positively.

Other novel features of my improved construction, such as the assembly of the interior working parts into a complete detachable unit easily inserted in the casing, the construction and arrangement of the porthole member controlling the supply of water or other fluid to the controlling chamber, the means for eliminating water hammer in the valve and providing for a positive refill for the closet bowl, and the details of the actuating and adjusting mechanism will be more completely explained in the following specifications, and specifically pointed out in the appended claims.

In the accompanying drawings—

Figure 1 is a sectional elevation of my improved flush valve mechanism;

Fig. 2 is an interior plan view of the device with the casing cover removed;

Figs. 3, 4, and 5 are sectional elevations similar to Fig. 1, with the operative parts shown in different positions and certain parts broken away;

Fig. 6 is a sectional plan view on the line 6—6 of Fig. 1;

Figs. 7, 8, and 9 are fragmentary views showing respectively a plan, sectional elevation, and interior side elevation of the inlet portion of the main casing; and, Fig. 10 is a plan view of a portion of the controlling valve tripping and holding device.

Referring to the drawings, the casing for my improved flush valve is made up of a main body portion 10, a cap or cover portion 11, an inlet portion 12, and an outlet portion 13. In this casing, surrounding the outlet portion, is a valve seat 14, upon which rests the main valve 15, provided with hollow cylindrical guiding members 16 and 17 extending respectively above and below the valve. The guiding member 17 operates in a stationary cylindrical sleeve 18 depending from the valve seat 14, and the guiding member 16 operates through an opening 19 in the center of dome-like partition 20. An annular diaphragm 21 of rubber, or other flexible material, is fastened to the main valve, and divides the space within the casing into an operating chamber 22 and a controlling chamber 23.

Mounted in the upper end of the cylindrical guiding member 16 is a valve seat 24, upon which rests the controlling valve disk 25. Depending from the controlling valve is a hollow cylindrical stem 26, threaded at 27 so that it may be adjusted vertically in the valve disk 25, and locked in adjusted position by means of the lock nut 28. The controlling valve disk 25 is held on its seat by the pressure of water in the controlling chamber 23, assisted by the spring 31, located between the flange 32 beneath the valve seat 24 and the flange 33 on said stem 26. Within the hollow stem 26 is telescopically mounted a pin or stem extension 34 having an enlarged head 35, which limits its downward movement by engagement with the shoulder 36 in said stem. The spring 37 tends normally to force the pin downwardly.

The guiding member 16 is provided on its exterior with the vertical ribs 38, which position said member in the opening 19 so as to permit water to flow freely from one side of the partition 20 to the other. The annular flange 39 on the main valve 15 wedges the inner portion of the diaphragm against the under surface of the partition 20 in the manner shown in Fig. 5, completely sealing the opening 19 when the main valve is in its maximum open position, and thereby preventing any blow out of the diaphragm due to an excess of pressure in the operating chamber 22.

The guiding member 17 has a smooth cylindrical exterior surface which co-operates with the vertical guiding ribs 40 on the sleeve 18, and also with the flange 41 in such a manner as to reduce the water hammer and produce the proper flushing action, as will be described more fully hereinafter.

The bell-shaped stationary member 42, made preferably of hard metal, serves as a protection for the flexible diaphragm against the wearing and damaging action of the water rushing from the inlet 12 through the operating chamber 22 to the outlet 13 when the main valve is opened. It also assists in steadying the operation of the main valve when the water pressure is high.

The protecting member 42, the flexible diaphragm, and the partition 20 are provided with the concentric interfitting cylindrical portions 43, 44, and 45 respectively, and the overlapping annular flanges 46, 47, and 48 respectively, which co-operate to position the operative parts of the valve mechanism relative to the casing, and to permit their ready removal as a unit from the casing for the purpose of repair and renewals. The flange 46 rests on the annular shoulder 49 in the body portion of the casing. The flange 47 rests on the flange 46, and the enlarged flange 48 rests on and extends beyond the flange 47, and is clamped into position between the cover and body portions of the casing in such a manner as to make a water tight connection.

Extending through the vertical cylindrical portions of the member 42, the diaphragm and the partition 20, and directly opposite and communicating with the inlet 12 through passageway 50, and arranged parallel to the direction of flow of water through said inlet, is a threaded nipple 51, containing a restricted opening or port 52, through which water is supplied to the controlling chamber 23. The enlarged head 53 of the nipple co-operates with the vertical side walls 54 of the passageway 50 to position and prevent rotative movement of the operative parts within the casing. This arrangement of the port member permits ready removal for cleaning, reduces the chances of clogging of the port by foreign matter lodging therein, or by improper assembly. The complete interior structure of main and controlling valves, diaphragm, partition, port nipple, etc., assembled into a complete individual unit, adapted to be applied to or removed from the casing by the removal of the cover, is important in the sense that it renders the working parts accessible for quick and easy repair. Furthermore, a complete unit of the interior working parts can be carried in stock, and a relatively inexperienced person can quickly place same in position in the casing as a substitute for a defective unit.

The actuating mechanism for the controlling valve will now be described. Attached to the side of the outlet portion 13 of the casing is a cylindrical housing member 55, provided with an inwardly projecting flange 56 at its outer end. Within this housing is a fixed bearing member 57 for a reciprocable member 58, carrying at its outer end a cone-shaped enlarged head 59 and at its inner end an annular tripping member 60 for the pin 34. This tripping member has a flattened portion 61 upon which the lower end of pin 34 rests normally, and an opening 62 through which the pin 34 is forced when released by a movement of the tripping member. The tripping member is held in a horizontal position, and the reciprocable member 58 is prevented from rotating in its bearing by the engagement of the pin 63 with the slot 64. The bearing member 57 is positioned, and held against rotation relatively to the casing portion 13, by means of the pin 57$^a$. Co-operating with the cone-shaped head is the cup-shaped end 65 of an operating handle 66. The spring 67 keeps the member 58 normally in the position shown in Fig. 1, with the head 59 in contact with the cup-shaped portion 65, and the periphery of said portion 65 in engagement with the flange 56. A movement of the handle in any direction with the flange 56 as a fulcrum will move the member inwardly against the action of spring 67.

Assuming that the inlet 12 has been connected to a source of water supply and that the outlet 13 has been connected to a closet bowl, and that the operating and controlling chambers have been filled with water, the operation of my improved flush valve will now be described. The parts of the valve structure are normally in the position shown in Fig. 1, with the main and controlling valves closed, and the water pressure in the operating chamber 22 equal to that in the controlling chamber 23. The handle 66 is tipped in any desired direction on the flange 56 as a fulcrum, thereby forcing the member 58 inwardly by a combined thrust and camming action, the portion of the edge of the cup-shaped member 65, diametrically opposite its fulcrum point riding up on the cam surface of the cone-shaped head 59, giving for a definite movement of the handle a very desirable extra movement of the valve tripping and holding member 60 which could not be obtained by the direct thrust of flat engaging surfaces. When the valve tripping and holding member has been moved a predetermined distance, so that the telescoping extension pin 34 of the controlling valve stem is no longer supported by the flat portion 61 of the tripping member, the pin 34 is suddenly forced by the action of gravity and spring 37 downwardly into the opening 62 of the tripping member. This position of the operating handle, the tripping member, and pin are clearly shown in Fig. 3. It will be noted that as long as the operating handle is maintained in this position the main valve 15 and its controlling valve 25 remain undisturbed and no water flows. However, when the handle 66 is released by the operator, and the spring 67 forces the actuating parts back to their normal positions, the portion 61 of the tripping member engages the side of the extension pin 34 and forces the pin and valve stem to one side, thereby tilting the controlling valve disk 22 on its seat, as shown in Fig. 4, permitting water to flow from the controlling chamber 23 into th outlet 13. The reduction of pressure in the controlling chamber 23 permits the pressure of the water in the operating chamber 22 to act on the underside of the flexible diaphragm and move said diaphragm, and with it the main valve 15 and its upper and lower guiding member 16 and 17, including the controlling valve and its seat, upwardly into a position corresponding to that shown in dotted lines in Fig. 5, and toward the maximum open position shown in full lines in said figure. This upward opening movement will continue rapidly until the lower end of the extension pin 34 slips off the holding portion 61 of the tripping member 60, and the controlling valve 25 tilts back onto its seat 24, and prevents further escape of water from the controlling chamber 23.

When the main valve is opened in this manner, the water rushes from the source of supply through the inlet and main valve opening, and thence through the outlet to the closet bowl, and the water also forces its way from the inlet through the restricted passageway or port 52 into the controlling chamber 23, so that when the controlling valve 25 is closed the gradual increase of pressure in the controlling chamber 23 forces the diaphragm slowly downward to close the main valve.

While the main valve moves slowly toward the closed position, the controlling valve stem and its extension pin 34 are pendant directly above the supporting surface of the tripping member. Hence, before the main valve reaches its closed position the pin 34 has engaged the supporting surface of the portion 61 of the tripping member and has had its downward movement arrested, although the main valve continues to its completely closed position, that is, the closing movement of the main valve causes the extension pin 34 to telescope within the valve stem 26 against the action of spring 37, and the operative parts have returned to the positions shown in Fig. 1 ready for a repetition of the cycle of operation above described.

In my improved flush valve, the adjustment of the duration of the flush is accomplished by an adjustment of the opening of the controlling valve to gage the volume of water permitted to escape from the controlling chamber in a definite interval of time. If a small volume of water is permitted to escape from the controlling chamber through the controlling valve the main valve will be opened only a small portion of its full capacity, and if a greater volume of water is permitted to escape from the controlling chamber the main valve will be opened a correspondingly greater amount. These adjustments are accomplished by changing the position of the valve stem 26 and its extension pin 34 relatively to the controlling valve disk 25, that is, by screwing the valve stem 26 up or down in the valve disk 25, and locking the stem and disk in adjusted position by means of the lock nut 28. It will be seen, therefore, that the duration of the flush is measured or timed by the adjustment of the length of the projecting end of the controlling valve stem and its telescopic extension portion below the seat 24 of the controlling valve disk 25, when said extension portion is unsupported by the tripping member. It will also be seen that with this construction for each adjustment of the valve stem the controlling valve will be held open for the desired definite period of time to insure a measured opening of the main valve so that there will always be a definite predetermined duration of flush every time the valve is operated.

Unless the valve casing is completely primed or filled with water through the charging opening 29, normally closed by plug 30 or in any other desired manner, before the flush valve is operated for the first time in connection with a pressure source of water supply, the first rush of water into the operating chamber from said source of supply will cause the main valve to be forced quickly into its maximum open position shown in Fig. 5 due to the fact that there is no water in the controlling chamber. In such a case the rigid annular safety flange 39 acts to force the inner portion of the diaphragm tightly against the under surface of the partition 20, as shown clearly in Fig. 5, thereby sealing the opening 19 and eliminating all danger of a blow out of the diaphragm no matter what the pressure may be below the diaphragm. After the first flush the water cushion has been formed by the natural filling of the controlling chamber through the restricted port opening 54, so that there is no further danger of a blow out of the diaphragm. In the event the controlling chamber is charged through the priming opening 29, there is no danger of a blow-out whatever, even when first operated.

The operation of my improved means for obtaining a positive flush cut-off and refill for the closet bowl without producing a water hammer will now be described. While the main valve is moving from its open to its closed position, the lower end of the cylindrical guiding member 17 is slowly traveling downwardly between guiding ribs 40 of the stationary depending sleeve 18 without interfering with the full flow of water through the main valve, and hence the bowl is in full flush. When the lower edge of this cylindrical member 17 comes opposite the flange 41 and before the main valve reaches its seat, the flow of water is suddenly reduced to such an extent as to break instantly the syphon which had been established in the closet bowl by the said full flush of water. During the balance of movement of the main valve to its fully closed position such water as can be delivered to the closet bowl through the annular space between the member 17 and flange 41, and through the grooves 41$^a$ and holes 41$^b$ (known as refill water) refills the closet bowl without producing another syphon. The grooves 41$^a$ and holes 41$^b$ may be dispensed with if it is found that the pressure employed produces the desired results without them or in the event the closet bowl is of such structure that a small quantity of refill water is required. It will be noted that the lower end of the cylindrical guiding and cut-off member 17 is of smaller diameter than the main valve seat 14. This fact, together with the cushioning action of the water between the time of the preliminary partial cut-off when the lower end of 17 comes opposite flange 41, and the final shut-off by the complete closure of the main valve 15 on its seat 14, tends to materially lessen, if not entirely eliminate, the objectionable water hammer encountered when flush valves are used on high pressure.

Although I have illustrated and described the preferred embodiment of my invention, it must be understood that many modifications and changes may be made without departing from the spirit of the invention, or its scope, as set forth in the appended claims.

What I claim is:

1. In combination, a valve, a valve stem connected therewith and provided with a telescopic extension, a tripping member cooperating with said extension, a handle for moving said tripping member to trip said extension, and automatic means for causing the tripping member to cooperate with the extension to open the valve.

2. In combination, a valve, a valve stem connected therewith and provided with a telescopic extension, a tripping member cooperating with said extension, a handle for moving said tripping member to trip said extension, and automatic means for causing the tripping member to cooperate with the extension to open the valve and maintain it in open position for a predetermined length of time after the handle is released.

3. In combination, a valve, a valve stem connected therewith and provided with a telescopic extension, a tripping member cooperating with said extension, a handle for moving said tripping member to trip said extension, and automatic means for causing the tripping member to cooperate with the extension to open the valve and maintain it in open position for a predetermined length of time after the handle is released, and means for varying the length of time the valve is held in open position.

4. In combination, a valve, a valve stem connected therewith and provided with a telescopic extension, a tripping member cooperating with said extension, a handle for moving said tripping member to trip said extension, and automatic means for causing the tripping member to cooperate with the extension to open the valve and maintain it in open position for a predetermined length of time after the handle is released, and means for closing the valve after it is released from the means for maintaining it in open position.

5. In combination, a valve, a valve stem connected therewith and provided with a telescopic extension, a tripping member cooperating with said extension, a handle for moving said tripping member to trip said extension, and automatic means for causing the tripping member to cooperate with the extension to open the valve and maintain it in open position for a predetermined length of time after the handle is released, means for moving said valve and valve stem away from the tripping member, and means for closing said valve after it becomes disengaged from said tripping member.

6. In combination, a valve, a valve stem connected therewith and provided with a telescopic extension pin, means for supporting the extension pin in telescoped position, manually operated means for moving the supporting means and tripping said pin, automatic means for tilting the pin to open the valve and for holding the valve open a predetermined length of time, means for releasing the pin from the holding means, and means for closing the valve.

7. In combination, a valve, a valve stem connected therewith and provided with a telescopic extension pin, means for supporting the extension pin in telescoped position, manually operated means for moving the supporting means and tripping said pin, automatic means for tilting the pin to open the valve and for holding the valve open a predetermined length of time, fluid pressure means for moving said pin upwardly and out of engagement with said holding means, and means for closing the valve.

8. In combination, a valve, a valve stem connected therewith and provided with a telescopic extension pin, means for supporting the extension pin in telescoped position, manually operated means for moving the supporting means and tripping said pin, automatic means for tilting the pin to open the valve and for holding the valve open a predetermined length of time, fluid pressure means for moving said pin upwardly and out of engagement with said holding means, means for closing the valve, and means for adjusting the length of said stem, including its telescopic pin, to vary the length of time the pin is held by the holding means, thereby varying the length of time the valve is held open.

9. In combination, a casing, means for dividing said casing into an operating and a controlling chamber, a valve operated by variations in fluid pressure in said chambers, adjustable automatically operated means for controlling the volume of fluid permitted to escape from the controlling chamber to control the duration of time the valve is held open, and means for setting the automatically operated means in operation.

10. In a flush valve mechanism, a casing enclosing an operating chamber and a controlling chamber separated by a flexible diaphragm, means for connecting said chambers to a source of water supply, a main valve connected to said diaphragm and operated by variations in water pressure in said chambers, a valve controlling an outlet passage from said controlling chamber, manually operated means, automatic means for opening said controlling valve after being set in operation by said manually operated means, and means for varying the duration of flush through said main valve by adjusting said automatic operating means to vary the time of opening of the controlling valve to vary the amount of water permitted to escape from the controlling chamber through said controlling valve.

11. In a flush valve mechanism, a casing having an inlet and an outlet, a flexible diaphragm in said casing dividing same into an operating and a controlling chamber, means for connecting said chambers to a source of water supply, a valve carried by said diaphragm controlling the outlet from said casing, and a stationary shield in said operating chamber adjacent to said diaphragm to protect the operating chamber side of the diaphragm against damage and wear due to the flow of water through said chamber and the outlet controlled by the valve.

12. In a flush valve mechanism, a casing having an inlet and an outlet, a flexible diaphragm in said casing dividing same into an operating and a controlling chamber, means for connecting said chambers to a source of water supply, a valve carried by said diaphragm controlling the outlet from said casing, and a stationary shield in said operating chamber adjacent to said diaphragm to protect the operating chamber side of the diaphragm against damage and wear due to the flow of water through said chamber and the outlet controlled by the valve, said diaphragm and protecting shield having concentric interfitting cylindrical surfaces positioning the diaphragm and shield in said casing.

13. In a flush valve mechanism, a casing, a flexible diaphragm in said casing dividing same into an operating and a controlling chamber, means for connecting said chambers to a source of water supply, a valve carried by said diaphragm controlling the outlet from said casing, a stationary partition in said controlling chamber, said diaphragm and partition having interfitting concentric cylindrical surfaces.

14. In a flush valve mechanism, a casing, a flexible diaphragm in said casing dividing same into an operating and a controlling chamber, means for connecting said chambers to a source of water supply, a valve carried by said diaphragm controlling the outlet from said casing, a stationary partition in said controlling chamber, said diaphragm and partition having interfitting concentric cylindrical surfaces, and a removable nipple extending through said cylindrical portions into the controlling chamber and provided with a restricted opening or port arranged adjacent the casing inlet and parallel to the direction of flow of water into the casing.

15. A flushing valve comprising a casing having an inlet and an outlet, a main valve closure operable by hydraulic pressure in said casing, an auxiliary valve carried by the main closure, and means manually operable in one direction and self-acting in the opposite direction to unseat and hold the auxiliary valve open until the main closure is fully open, and means carried slidably by the latter valve for operatively connecting it and the said means during automatic action of the latter.

16. A flush valve comprising a casing having inlet and outlet openings, a valve seat at the outlet opening, a flexible member attached to the casing and carrying a valve operative to engage said seat to control flow and forming a separate chamber in the casing, a relief valve for controlling the operation of said diaphragm, a manually operated trip automatically acting after manual operation to unseat the relief valve and hold it unseated a predetermined length of time until the main valve is fully open, and means on the relief valve normally held in disconnecting position by the trip and when released thereby then providing operative connection with the relief valve and said trip.

17. A flush valve comprising a casing having inlet and outlet openings, a valve seat at the outlet opening, a flexible member attached to the casing and carrying a valve operative to engage said seat to control flow and forming a separate chamber in the casing, a relief valve for controlling the operation of said diaphragm, a manually operated trip automatically acting after manual operation to unseat the relief valve and hold it unseated a predetermined length of time until the main valve is fully open, and adjustable means on the relief valve normally held in disconnecting position by the trip and when released thereby then providing operative connection with the relief valve and said trip.

18. A flush valve comprising a casing with an inlet and an outlet, a valve seat between the same, a flexible diaphragm provided with a valve closure to engage the seat, said closure having an outlet opening and a relief valve to close the same, tripping means for the valve comprising a trip member carried by the relief valve, a manual lever, and an actuator movable in one direction thereby and automatically movable in the opposite direction and engageable with the trip member on the said opposite direction of movement to unseat the relief valve, said member consisting of a pin held normally telescoped in the relief valve by the actuator, and when released thereby then coupling it to the relief valve.

19. A flush valve comprising a casing with an outlet and an inlet, a valve seat between the same, a flexible diaphragm provided with a closure to engage said seat, said closure having an outlet and a valve seat thereabout, means for maintaining communication between the inlet and the chambers on opposite sides of the diaphragm, one of said communicating means being provided with a restricted passageway, a relief valve on the closure and having a telescopic stem, and actuating means for normally supporting the sliding member of the stem telescoped, movement of said means first releasing the sliding member and then engaging the pin and through it opening the relief valve.

20. A flush valve comprising a casing with an inlet and an outlet, a valve seat at the latter, a flexible diaphragm provided with a valve closure to engage said seat, said closure having an outlet opening and a valve seat thereabout, a relief valve seatable thereupon, and manually controlled automatic means for actuating said relief valve and holding it in open position until the main valve closure is fully opened from its seat, including a movable abutment member, and a pin slidably carried by the valve and engageable by said abutment member to unseat the valve, whereupon the pin is lifted to supported position on said member.

21. In a valve, a casing with inlet and outlet openings, a ported closure for the outlet, a relief valve on said closure, a telescopic stem operatively associated with said relief valve, trip means for normally holding said stem telescoped, means for moving said trip means to release the telescoped stem, means for returning said trip means to initial position to tilt said stem and open the relief valve, and pressure operated means secured to said closure for opening the same on actuation of the relief valve and for carrying the stem from tilted position on said trip means to a normal perpendicular position thereon.

In testimony whereof I affix my signature.

ROBERT R. BANTA.